(12) United States Patent
McNay

(10) Patent No.: US 7,510,399 B2
(45) Date of Patent: Mar. 31, 2009

(54) TEACHING CLOCK

(76) Inventor: William Arthur McNay, P.O. Box 1874, Ruidoso, NM (US) 88355

( * ) Notice: Subject to any disclaimer, the term of this patent is extended or adjusted under 35 U.S.C. 154(b) by 720 days.

(21) Appl. No.: 11/075,605

(22) Filed: Mar. 9, 2005

(65) Prior Publication Data

US 2006/0216682 A1    Sep. 28, 2006

(51) Int. Cl.
*G09B 19/12* (2006.01)
(52) U.S. Cl. .................................................. 434/304
(58) Field of Classification Search ............... 434/304; D19/64
See application file for complete search history.

(56) References Cited

U.S. PATENT DOCUMENTS

| | | | | |
|---|---|---|---|---|
| 802,807 | A * | 10/1905 | Fitch | 434/304 |
| 1,276,344 | A * | 8/1918 | Gilman | 434/304 |
| 1,356,929 | A * | 10/1920 | Lewers | 434/304 |
| 2,567,497 | A * | 9/1951 | Sorensen | 434/104 |
| 2,647,330 | A * | 9/1953 | Ford | 434/304 |
| D193,659 | S * | 9/1962 | Matricardi | D19/64 |
| D219,216 | S * | 11/1970 | Speers | D19/64 |
| 3,608,214 | A * | 9/1971 | Rancati | 434/304 |
| 3,967,389 | A | 7/1976 | Brooks | |
| 4,015,346 | A | 4/1977 | Ogasawara | |
| 4,124,945 | A * | 11/1978 | Totten | 434/304 |
| 4,219,943 | A | 9/1980 | Grimes | |
| 4,368,045 | A * | 1/1983 | Kuh | 434/304 |
| D268,686 | S * | 4/1983 | Wolf | D19/64 |
| 5,167,507 | A * | 12/1992 | Cobb et al. | 434/304 |
| 5,604,717 | A * | 2/1997 | Wang | 368/223 |
| 6,030,228 | A * | 2/2000 | Armstrong | 434/304 |
| 6,071,124 | A * | 6/2000 | Ang et al. | 434/304 |
| 6,354,841 | B1 * | 3/2002 | Bradt | 434/304 |
| 2003/0210613 | A1 | 11/2003 | Bloch | |

* cited by examiner

*Primary Examiner*—Kurt Fernstrom
(74) *Attorney, Agent, or Firm*—Bruce E. Weir

(57) ABSTRACT

A clock for teaching time-telling to children has a base with a circular recess containing twelve 30-degree removable wedges forming an annular disk. Each radial edge of each wedge has a semicircular opening that aligns with a complimentary semicircular opening on an adjacent wedge to form a hole that accepts a removable disk numbered from one to twelve. A long pointer and a short pointer pivot about a fastener in a center block, simulating clock hands. Scales denoting minutes, hours, roman numerals, and different color names are arrayed around the perimeter of the circular recess. Each wedge is colored to correspond to a different color name. A child may repeatedly assemble and disassemble the wedges and numbered disks to create a clock face and operate pointers to reinforce time-telling lessons.

7 Claims, 2 Drawing Sheets

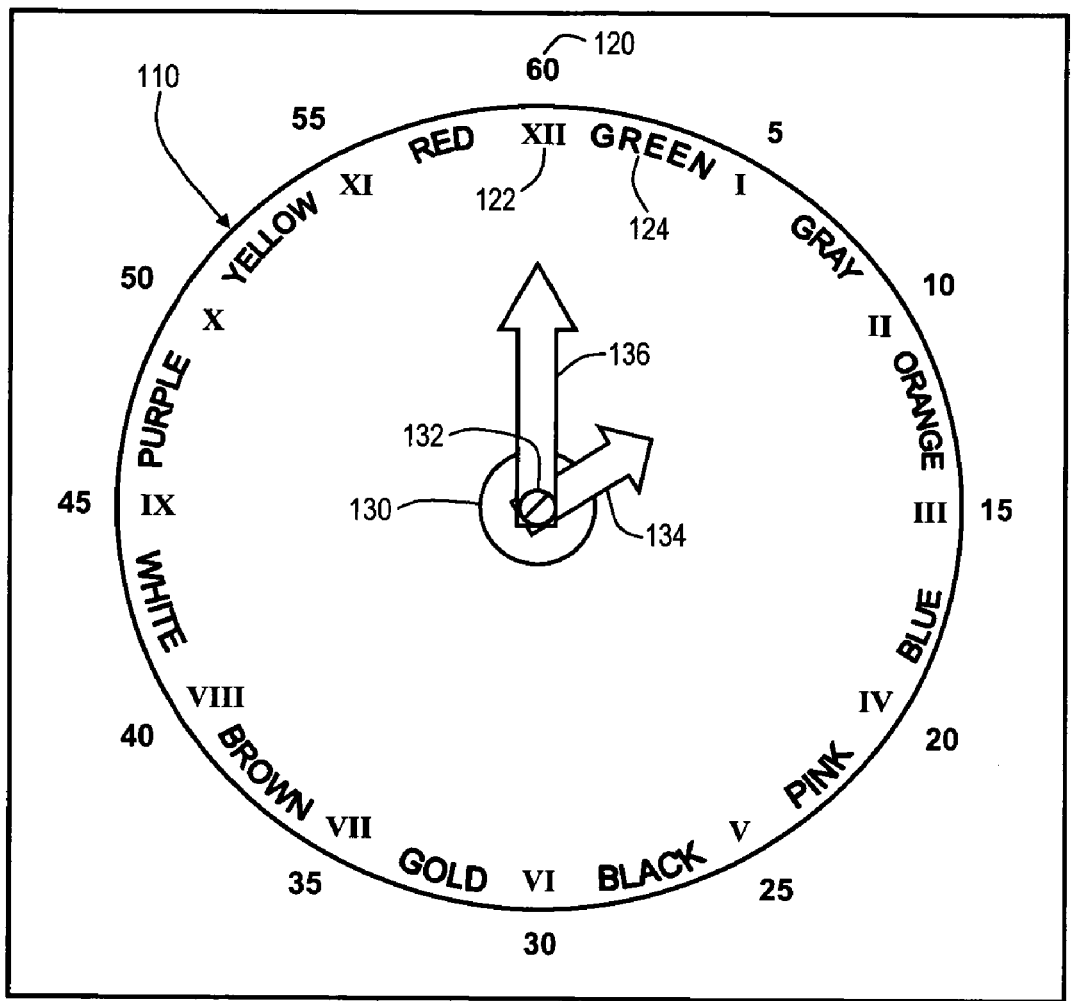
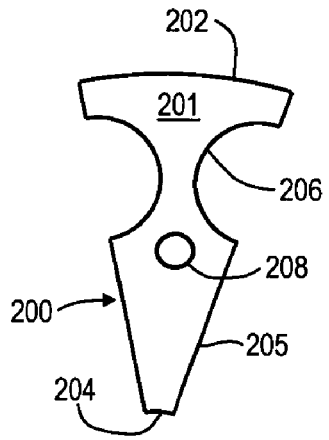
FIG. 2A
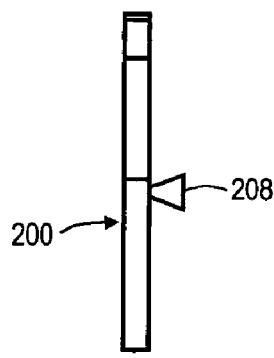
FIG. 2B
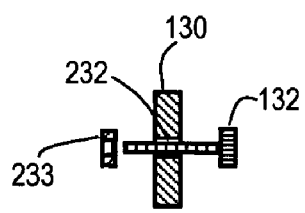
FIG. 2C
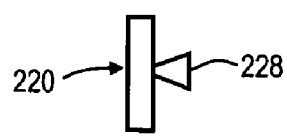
FIG. 2D
FIG. 1

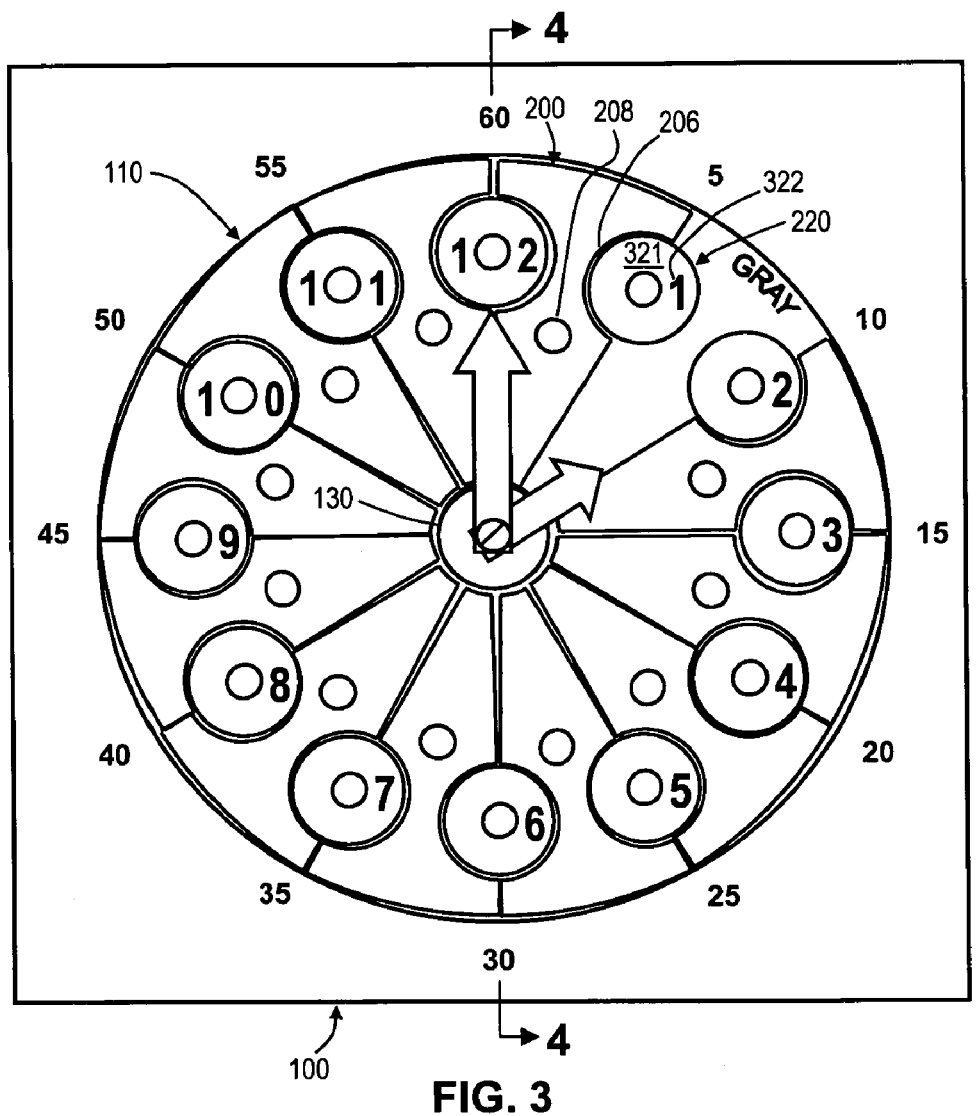
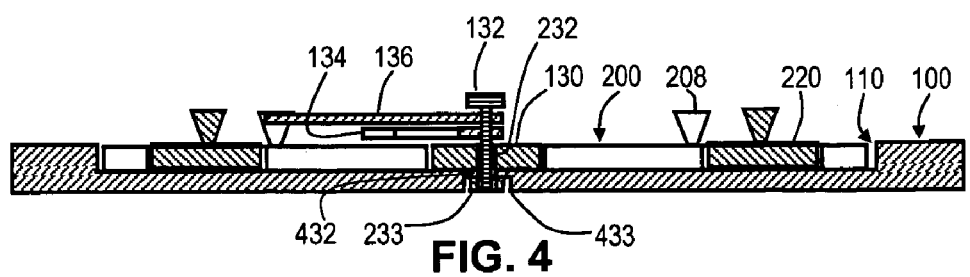
FIG. 3
FIG. 4

TEACHING CLOCK

BACKGROUND AND SUMMARY

Educators have long known that children can more easily grasp abstract concepts when such concepts are embodied in teaching aids that a child can physically manipulate. A well-designed teaching aid may clarify conceptual relationships and can help a child learn and remember a lesson by repetitively working through a concept in a simplified, step-by-step fashion. To accomplish this, an effective teaching aid engages and holds a child's interest by being simple enough for the child to understand, challenging enough to be worth several attempts, and enjoyable enough to become a play object.

Clock time is one of the key abstract concepts that every child must learn to become a functioning adult. Many different clock-based teaching aids have been developed, ranging from simple clock faces with moveable hands to more complex devices that attempt to convey concepts such as time before and after an hour ("quarter 'til," "half-past," etc.) with color-coding and/or moving dials that reveal hidden numerical scales. Unfortunately, operation of the most complex devices presumes the level of understanding for which the child strives, often making use of the device an exercise in frustration. Conversely, the simplest devices may accurately simulate clock operation but are not interesting enough to hold a child's attention. What is needed is a teaching clock that combines the simplicity of a basic clock face with features that engage a child's interest long enough to make clock operation memorable.

The present invention engages and holds a child's interest with a teaching clock having a base containing a recessed circle that holds a plurality of differently-colored, removable wedges, which, when assembled, form a disk. Each radial edge of each wedge has an opening that aligns with a similar opening on an adjacent wedge to create a hole in which a removable number block may be placed. Number blocks are numbered one through twelve and arrayed in clock fashion around the face of the disk. Long and short pointers simulate clock hands. A child may repeatedly assemble and disassemble the removable parts in the manner of a puzzle and operate the clock hands to understand and reinforce time-telling concepts.

These features and advantages of the present invention, and more, are illustrated below in the drawings and detailed description that follow.

BRIEF DESCRIPTION OF THE DRAWINGS

FIG. 1 shows a plan view of a clock base.
FIG. 2A shows a plan view of a color wedge.
FIG. 2B shows an elevation view of a color wedge.
FIG. 2C shows a cross-sectional view of a center block, screw, and retaining nut.
FIG. 2D shows an elevation view of a number block.
FIG. 3 shows a plan view of a clock base with color wedges and number blocks installed.
FIG. 4 shows a cross-sectional view of the clock base of FIG. 3.

DETAILED DESCRIPTION

FIG. 1 shows a plan view of a preferred embodiment of a clock base of the present invention. The base 100 may be rectilinear, round, polygonal, or any other convenient or attractive shape. Preferred construction materials are wood or plastic, although metals, ceramics, and other materials known in the art will serve. A portion of the base 100 contains a circle 110. The circle 110 is a broad, shallow cylindrical cavity that may be cut into the base with a router or milling tool, formed by laminating a sheet of material with a circular opening onto another sheet, or produced by other means known in the art.

Arabic numerals 120 denoting five-minute or five-second intervals are molded, printed, inscribed, or embossed immediately outside the perimeter of the circle 110 at points corresponding to 30 degree sections of arc, with "60" appearing at the 12 o'clock position, "5" at the 1 o'clock position, "10" at the 2 o'clock position, and so on around the circle 110. Roman numerals 122 may be molded, printed, inscribed, or embossed within the perimeter of the circle 110, with roman numeral "XII" adjacent arabic numeral "60," roman numeral "I" adjacent arabic numeral "5," and so on around the circle 110. Color names 124 are also molded, printed, inscribed, or embossed within the perimeter and between the roman numerals. In FIG. 1, "GREEN" appears between roman numerals "XII" and "I," "GRAY" between "I" and "II," and so on with orange, blue, pink, black, gold, brown, white, purple, yellow, and red, or any other combination and sequence of colors deemed suitable. Each color name 124 is preferably displayed in the color named, i.e. "GREEN" is displayed in green, "RED" in red, etc.

A center block 130 is affixed at the center of the circle 110 with a machine screw 132, rivet (not shown), or other fastener known in the art. The center block 130 is preferably a disk with a thickness approximately equal to the depth of the circle 110 and made of any material suitable for the base 100. The fastener also affixes a short pointer 134, indicating hours, and a long pointer 136, indicating minutes, both of which pivot around the fastener to simulate clock hands.

FIG. 2C shows a cross-sectional view of a center block 130 with a screw 132 passing through a central hole 232 to screw into a retaining nut 233. FIG. 4 shows a cross-sectional view of an assembled teaching clock, with the screw 132 passing through the pointers 134, 136, the central hole 232 in the center block 130, a hole 432 in the base 100, and the retaining nut 233, which rests within a recessed opening 433 in the base 100. Washers (not shown) may be placed between the head of the screw 132, the pointers 134, 136, and the center block 130.

FIG. 2A shows a plan view of a color wedge 200. In a preferred embodiment, a color wedge 200 is a radial section spanning 30 degrees of arc of an annular disk, having at one end an outer radius 202 slightly smaller than the radius of the circle 110 and at the opposite end an inner radius 204 slightly larger than the radius of the center block 130. A semicircular opening 206 is cut from or formed into each radial edge 205 of a color wedge 200. A knob 208 or dowel is affixed to the upper surface 201 of the color wedge 200 to facilitate manipulation. This preferred embodiment of the present invention utilizes twelve color wedges 200, each with at least an upper surface 201 colored to correspond to a different color name 124.

FIG. 2B shows an elevation view of a color wedge 200. A preferred color wedge 200 has the same thickness as a center block 130 and is made of any material suitable for the base 100. In alternate embodiments, semicircular openings may be replaced by polygonal openings of any suitable shape. A circular or polygonal opening may be placed entirely within a single color wedge, preferably with color wedge positions rotated 15 degrees to maintain normal clock face number positions.

FIG. 2D shows an elevation view of a number block 220 with a knob 228 affixed for easy manipulation. A preferred number block 220 is a disk of the same thickness as the center block 130 and made of any material suitable for the base 100.

As shown in FIG. 3, the radius of each number block 220 is slightly smaller than the radius of a semicircular opening 206. A number block may be any suitable polygon to fit alternate embodiments having polygonal openings in place of semicircular openings. A preferred embodiment of the present invention utilizes twelve number blocks, each with a different arabic numeral 322 from one to twelve molded, printed, inscribed, or embossed on its face 321. Each arabic numeral 322 on a number block 220 corresponds to a roman numeral 122 appearing at a point within the circle 110 nearest the correct position for that color block. Each color block face 321 also is differently colored, usually although not necessarily with colors from the same palette as the color wedges 200.

A child can utilize the base 100 to construct a clock by placing color wedges and number blocks in appropriate positions within the circle 110. Starting with the empty base 100 of FIG. 1, a green color wedge 200 may be placed within the circle 110 with the inner radius 204 adjacent to the center block 130 and the outer radius 202 covering the color name 124 "GREEN" and spanning the arc between the arabic numerals 120 "60" and "5." Remaining color blocks 200 are similarly positioned until the circle 110 is filled.

When two adjacent color wedges 200 are correctly positioned, two facing semicircular openings 206 create a circular hole sized to accept a number block 220. Each number block 220 may be inserted in an appropriate hole to create the usual twelve-digit sequence of a clock face. FIG. 3 shows a teaching clock with all number blocks 220 positioned and all but one color wedges 200 positioned. The colors of the number blocks may or may not correlate with the colors of adjacent color wedges.

Although the correct positions of the color wedges and number blocks are fixed, both may be assembled, disassembled, and reassembled in any sequence the child finds interesting, giving the present invention the appeal of a simple puzzle. Many children find such puzzles engaging, and in the course of repeatedly assembling the clock a child is repeatedly exposed to associations between hours in arabic numerals on number blocks, minutes or seconds in arabic numerals outside the circle, roman numerals within the circle, and colors with color names.

Once the clock face is assembled the child may manipulate the pointers to denote different times of the day. In a preferred embodiment, rotation of the long pointer 136 is blocked by the knobs 208 on adjacent color wedges 200, forcing a child to remove and replace each color wedge 200 as the long pointer 136 is rotated. Alternate embodiments may employ a long pointer that is not blocked. In any embodiment the combination of reasoning, memory, and physical activity a child uses to assemble the clock assists the child in understanding and recalling the abstract concepts embodied in a clock, along with color/name and arabic/roman numeral associations.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

The invention claimed is:

1. A teaching clock, comprising:
    a base;
    a circle, the circle recessed within the base;
    a center block, the center block affixed to the base at the center of the circle;
    a long pointer and a short pointer, the long pointer and short pointer rotatably attached to the center block, the length of the long pointer defining a first radius from the point at which the long pointer is attached to the center block;
    a plurality of removable number blocks, each number block displaying a different number; and
    a plurality of removable color wedges, each color wedge displaying a different color, each color wedge having an aftached knob, each color wedge capable of being positioned within the circle adjacent to another color wedge, each knob disposed at second radius from the point at which the long pointer is attached to the center block when the color wedge attached to the knob is positioned within the circle adjacent to another color wedge, the second radius being less than the first radius, each knob on a color wedge positioned within the circle thereby blocking the movement of the long pointer as the long pointer sweeps around the circle, each color wedge having at least a first and a second radial edge opening, each radial edge opening disposed to form a portion of a number block hole when at least two color wedges are adjacent, each number block hole sized and shaped to at least partially contain a number block.

2. A teaching clock as claimed in claim 1, further comprising a first scale, the first scale comprising arabic numerals disposed near and outside the perimeter of the circle.

3. A teaching clock as claimed in claim 1, farther comprising a second scale, the second scale comprising roman numerals disposed near and inside the perimeter of the circle.

4. A teaching clock, comprising:
    a base;
    a circle, the circle recessed within the base;
    a center block, the center block affixed to the base at the center of the circle;
    a long pointer and a short pointer, the long pointer and short pointer rotatably attached to the center block, the length of the long pointer defining a first radius from the point at which the long pointer is attached to the center block;
    twelve removable number blocks, each number block displaying a different arabic numeral from one to twelve;
    twelve removable color wedges, each color wedge having an attached knob, each color wedge comprising a radial section spanning 30 degrees of arc of an annular disk and displaying a different color, each color wedge capable of being positioned within the circle adjacent to other color wedges to form an annular disk between the perimeter of the circle and the center block, each knob disposed at second radius from the point at which the long pointer is attached to the center block when the color wedge attached to the knob is positioned within the circle adjacent to another color wedge, the second radius being less than the first radius, each knob on a color wedge positioned within the circle thereby blocking the movement of the long pointer as the long pointer sweeps around the circle, each color wedge having a semicircular opening on each radial edge, each semicircular opening disposed to align with a semicircular opening on an adjacent color wedge to form a number block hole sized and shaped to contain a number block;
    a first scale, the first scale comprising arabic numerals disposed near and outside the perimeter of the circle;
    a second scale, the second scale comprising roman numerals disposed near and inside the perimeter of the circle; and twelve different color names, the color names disposed near and inside the perimeter of the circle, each color name corresponding to the color of a different color wedge.

5. A method for familiarizing a person with the appearance and operation of an analog clock, comprising:

positioning removable wedges with attached knobs to simulate a clock face;

placing removable number blocks within number block holes disposed within the clock face;

rotating an hour pointer to indicate a selected of day;

rotating a minute pointer until the minute pointer contacts a first knob;

removing the wedge to which the first knob is attached;

rotating the minute pointer until the minute pointer contacts a second knob;

replacing the wedge aft ached to the first knob.

6. A method for familiarizing a person with the appearance and operation of an analog clock as claimed in claim 5, wherein each number block displays a different clock face number from one to twelve and is placed in a number block hole corresponding to the correct clock face position for the displayed clock face number.

7. A method for familiarizing a person with the appearance and operation of an analog clock as claimed in claim 5, wherein each removable wedge displays a different color and is positioned adjacent to a corresponding color name.

* * * * *